United States Patent [19]

Zuckerwar et al.

[11] Patent Number: 5,325,720
[45] Date of Patent: Jul. 5, 1994

[54] METHOD FOR MAKING A DYNAMIC PRESSURE SENSOR AND A PRESSURE SENSOR MADE ACCORDING TO THE METHOD

[75] Inventors: Allan J. Zuckerwar, Newport News; William E. Robbins, Achilles; Glenn M. Robins, Gloucester, all of Va.

[73] Assignee: The United States of America as represented by the Administrator of the National Aeronautics and Space Administration, Washington, D.C.

[21] Appl. No.: 138,046

[22] Filed: Oct. 7, 1993

[51] Int. Cl.5 .......................... G01L 7/08; G01M 9/00
[52] U.S. Cl. ...................................... 73/756; 29/454; 73/147; 73/715; 92/103 M
[58] Field of Search ................ 73/756, 147, 715–728, 73/167; 92/103 M, 5 R; 29/621.1, 25.41, 454, 595

[56] References Cited

U.S. PATENT DOCUMENTS

| | | | |
|---|---|---|---|
| 2,603,593 | 7/1952 | Blickensderfer | 204/16 |
| 3,600,949 | 8/1971 | Janeschitz-Kriegel et al. | 73/395 |
| 3,671,406 | 6/1972 | Mattia et al. | 204/40 |
| 4,052,628 | 10/1977 | Hayer | 310/333 |
| 4,149,423 | 4/1979 | Zuckerwar et al. | 73/724 |
| 4,454,765 | 6/1984 | Lodge | 73/756 |
| 4,570,097 | 2/1986 | Shukla et al. | 310/338 |
| 4,715,231 | 12/1987 | Lee, II et al. | 73/709 |
| 4,770,032 | 9/1988 | Plentovich et al. | 73/147 |
| 5,007,286 | 4/1991 | Malcolm et al. | 73/181 |
| 5,249,468 | 10/1993 | Benedikt et al. | 73/756 |

Primary Examiner—Donald Woodiel
Attorney, Agent, or Firm—Kimberly A. Chasteen

[57] ABSTRACT

A method for providing a perfectly flat top with a sharp edge on a dynamic pressure sensor using a cup-shaped stretched membrane as a sensing element. First, metal is deposited on the membrane and surrounding areas. Next, the side wall of the pressure sensor with the deposited metal is machined to a predetermined size. Finally, deposited metal is removed from the top of the membrane in small steps, by machining or lapping while the pressure sensor is mounted in a jig or the wall of a test object, until the true top surface of the membrane appears. A thin indicator layer having a color contrasting with the color of the membrane may be applied to the top of the membrane before metal is deposited to facilitate the determination of when to stop metal removal from the top surface of the membrane.

8 Claims, 3 Drawing Sheets

METHOD FOR MAKING A DYNAMIC PRESSURE SENSOR AND A PRESSURE SENSOR MADE ACCORDING TO THE METHOD

ORIGIN OF THE INVENTION

The invention described herein was made by employees of the U.S. Government and may be manufactured and used by or for the Government without the payment of any royalties thereon or therefor.

BACKGROUND OF THE INVENTION

1. Field of the Invention

This invention relates in general to measurement of pressure fluctuations in a high speed boundary layer along a test surface, and specifically to a method for making a stretched membrane in a dynamic pressure sensor fit precisely flush with a test surface so fluid flow along the test surface is not disturbed by the membrane or its edges.

2. Description of the Related Art

In a known pressure sensor, the sensing element is a thin stretched membrane, which is displaced from its equilibrium position in proportion to an incident time-varying pressure. The deflections of the membrane can be measured by several known transducer methods, for instance by electronic measurement of variations in capacitance between the membrane and a fixed electrode. A stretched membrane pressure sensor has the advantages of superior acoustic impedance match to air and low surface mass density, so it provides high sensitivity to applied pressure variations and low sensitivity to mechanical vibrations.

A stretched membrane can be made by starting with an oversized flat membrane that is prestressed in a fixture while the center of the membrane is bonded to the top surface of the pressure sensor body. After the membrane is bonded to the pressure sensor body, the prestress fixture is removed, and the edges of the membrane are cut flush with the edges of the pressure sensor body. If the bond is by use of an adhesive, it is possible to get a flat membrane that can be fitted flush with a test surface through a hole in the test surface. This design has the disadvantage that the dynamic characteristics of the pressure sensor depend severely upon the strength of the adhesive bond, which deteriorates with aging and temperature cycling and is subject to creep. Bonding a prestressed flat membrane by brazing or welding has been attempted, but it has proven difficult to obtain an accurately flat membrane when such bonding methods are used.

A stretched membrane can also be made by stretching a slack membrane after it is mounted on the pressure sensor body. A known design starts with a cup-shaped membrane, which is fitted over the top of a tubular pressure sensor body, whereafter the side wall of the cup-shaped membrane is brazed or welded to the side wall of the pressure sensor body. Finally, a thin-walled tube fitting inside the tubular pressure sensor body is pressed against the inside of the membrane to produce the desired pre-stress in the membrane. This design provides stretched membrane with an accurately flat top surface, but the membrane will always have a rounded edge, so the flat membrane surface cannot extend all the way to the outside wall of the pressure sensor body. This design accordingly causes a gap between the edge of the mounting opening and the flat part of the membrane, which destroys the continuity of the test surface.

In cases where pressure variations in a high speed boundary layer along a test surface are to be measured, it is imperative that surface discontinuities resulting from pressure sensor mounting do not exceed the roughness of the test surface. Even minute pressure sensor misalignment can lead to measurement errors, premature transition to turbulence, or other disruptions of the flow. None of the known pressure sensors can provide both perfectly flush mounting and freedom from creep and aging in the measurement accuracy.

SUMMARY OF THE INVENTION

Accordingly, it is an object of the present invention to achieve a method for making a stable dynamic pressure sensor that can be fitted precisely flush with a test surface, so fluid flow along the surface is not disturbed by the presence of the pressure sensor.

Another object of the present invention is to achieve a method for making a dynamic pressure sensor with a stretched membrane that has a flat top and square edges.

A further object of the present invention is to achieve a method for mounting a dynamic pressure sensor precisely flush with a test surface.

Still another object of the present invention is to obtain an accurate and stable dynamic pressure sensor with a flat top and square edges.

These and other objects are accomplished by a method for making a dynamic pressure sensor having a flat top with a sharp edge, which comprises the steps of providing a dynamic pressure sensor with a stretched metal membrane in the form of an inverted cup with a flat top surface and rounded edge, depositing metal on the membrane, and machining the deposited metal to form a substantially cylindrical side wall and a flat top surface flush with the top surface of the membrane.

BRIEF DESCRIPTION OF THE DRAWINGS

The present invention and the objects achieved by it will be understood from the description herein, with reference to the accompanying drawings, in which.

DETAILED DESCRIPTION OF A PREFERRED EMBODIMENT

Figure 1:
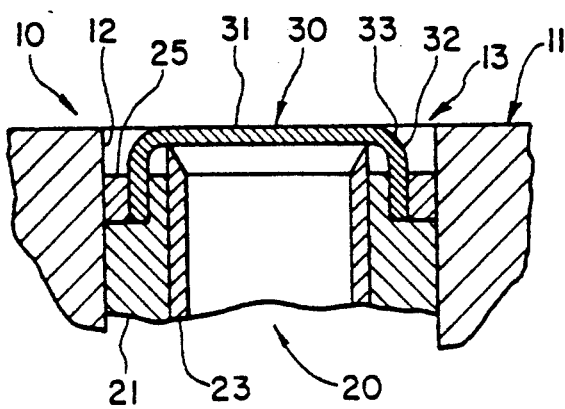
FIG. 1 is a partial cross sectional view along an axial plane of a prior art pressure sensor mounted in a test panel.

FIG. 1 is a cross sectional view along the axis of the tip portion of a stretched membrane pressure sensor 20 of known design. A pressure sensor body 21 is mounted in a hole 12 in a wall 10 with a test surface 11 subject to pressure variations to be measured. The pressure variations act on a stretched membrane 30 shaped as an inverted cup. A side wall 32 of the membrane 30 is mounted on the tip of the pressure sensor body 21 by means of a retaining ring 25 and suitable bonding (not shown). A membrane tension adjuster 23 is pressed against the inside of the membrane 30 to pre-stress the top of the membrane 30. The pre-stress makes the top surface 31 of the membrane 30 flat, and gives the membrane 30 improved dynamic properties. The stretched top of the membrane 30 deflects under the influence of pressure variations at the test surface 11, and these deflections are used as a measure of the pressure variations. The deflections of the membrane can be measured by several methods that are well known to those skilled in the art, for instance by means of a capacitive sensor mounted near the inside of the membrane 30.

It can be seen from FIG. 1 that there is a ring shaped gap 13 between the flat top surface 31 of the membrane 30 and the test surface 11 in the prior art design. This gap is not significant in some applications, but in cases where fluid flow occurs along the test surface 11, such a gap 13 will cause distortions of the boundary flow pattern, and the measurement accuracy will be severely affected. The gap can be made smaller than shown by reducing the thickness of the retaining ring 25. However, even if the retaining ring 25 is eliminated entirely, there will always be a residual gap 13, because the edge 33 of the membrane 30 can never be made exactly square. The cup shaped membrane 30 is made by forming a metal foil in a series of dies, which requires a small edge radius on the membrane edge 30, and a small slope of the side wall 32 of the membrane 30 is also caused by the stretching of the membrane 30 by the tension adjuster 23.

The residual gap 13 between the stretched top surface 31 of the membrane 30 and the test surface 11 can not be tolerated in certain applications. The gap 13 can be avoided if the cup-shaped membrane shown in FIG. 1 is replaced by a flat membrane, which is prestressed while it is bonded to a flat tip on a pressure sensor body and is cut square with the top after the bonding has cured. All known bonding methods that can produce an accurately flat membrane, however, are subject to creep and aging, so there is a need for an improved pressure sensor design that will provide a perfectly flush fit between the pressure sensor and the test surface.

A preferred method according to the present invention for making a pressure sensor that will fit perfectly flush with a test surface is described below, with reference to FIGS. 2–8, which illustrate different steps of the method.

Figure 2:
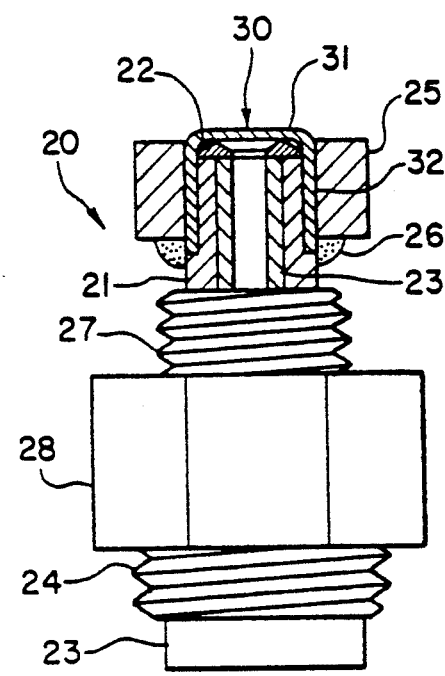
FIG. 2 is a lateral view, partly in section, of a pressure sensor being made according to the present invention with a cup shaped membrane bonded to the pressure sensor body.
Figure 3:
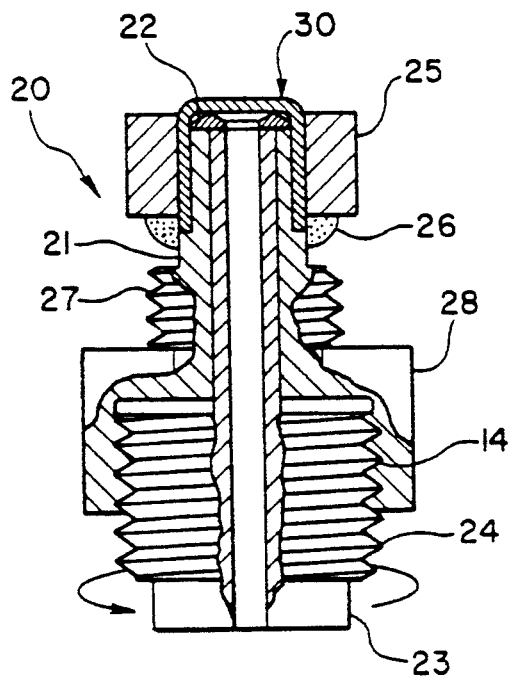
FIG. 3 is a cross sectional view along an axial plane of a pressure sensor being made according to the present invention, illustrating the stretching of the membrane.

The first step is to provide a pressure sensor with a stretched cup-shaped membrane as a sensing element, as illustrated in FIGS. 2 and 3.

FIG. 2 shows a side view, partly in section, of a pressure sensor 20 with a pressure sensor body 21. A cup shaped membrane 30 is fitted over the tip of the pressure sensor body 21, and a tight fitting retaining ring 25 is pressed over the side wall 32 of the membrane 30. The membrane 30 is suitably formed from a thin foil of nickel or Inconel by drawing in a series of dies, as is well known in the art. The foil thickness is typically about 0.001 inches (0.025 mm). All other parts of the pressure sensor 20 are made from type 347 or 304 stainless steel, or an other suitable metal. A weld 26 joins the lower edge of the side wall 32 of the membrane 30 and the lower end of the retaining ring 25 to the pressure sensor body 21. The weld 26 is preferably made by electron beam welding, but other welding methods can be used. The membrane 30 may be made from materials other than those described above, and it can be attached to the body 21 of the pressure sensor 20 by brazing or other methods that provide a sufficiently strong and permanent bond, instead of by welding.

FIG. 3 illustrates how the top of the membrane 30 is stretched. A tension ring 22 is pressed against the inside of the membrane 30 by means of a membrane tension adjuster 23. When the tension adjuster 23 is turned clockwise as indicated by an arrow in FIG. 3, a male thread 24 on the tension adjuster 23 engages a female thread 14 in the pressure sensor body 21, so the tension adjuster moves axially inside the tubular tip of the pressure sensor body 21. The tension adjuster 23 slides against the underside of the tension ring 22 when it is rotated, so the tension ring 22 does not need to rotate. Proper tensioning of the membrane requires only a very small axial displacement of the tension ring 22.

Figure 4:
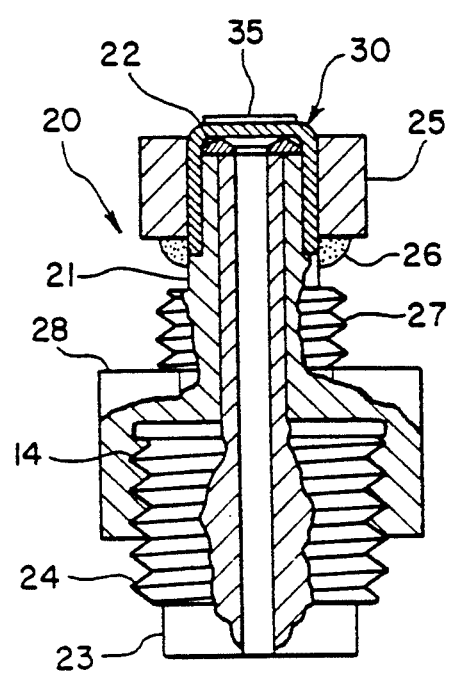
FIG. 4 is a cross sectional view along an axial plane of a pressure sensor being made according to the present invention, with a thin indicator layer applied to the top of the membrane.

The second step is to apply a thin indicator layer 35 having a color different from the color of the membrane 30 to the top surface 31 of the membrane 30, as shown in FIG. 4. The indicator layer 35 may be a dye, such as Dykem Layout Fluid DX100 (blue) or DX296 (red), or a thin layer of electroplate, such as copper or gold. The purpose of the indicator layer is to facilitate the final stages in the making of the pressure sensor 20, as will be described below.

Figure 5:
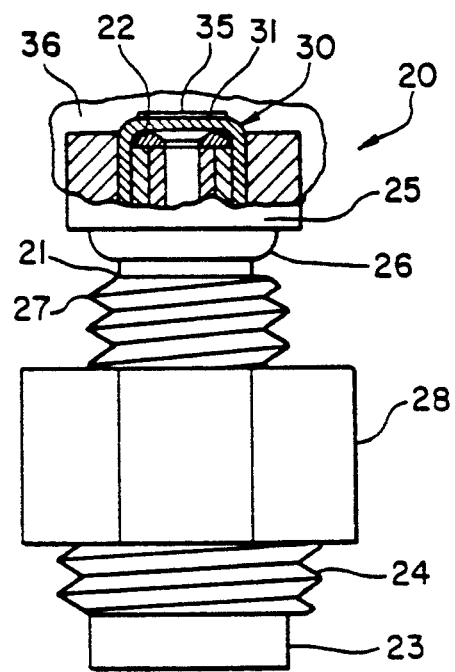
FIG. 5 is a lateral view, partly in section, of a pressure sensor being made according to the present invention, with metal deposited on the membrane over the indicator layer and on the side wall of the pressure sensor body.

The third step is to deposit a metal 36 on the membrane 30 and the retaining ring 25, as shown in FIG. 5. Nickel is a preferred metal for depositing on the pressure sensor 20, but a number of alternative metals or alloys can be used. Electro-deposition is the preferred method for depositing the metal 36, but other deposition methods can be used. The details of processes for deposition of metal 36 are well known in the art, and are not part of the invention, so they will not be described further herein.

Figure 6:
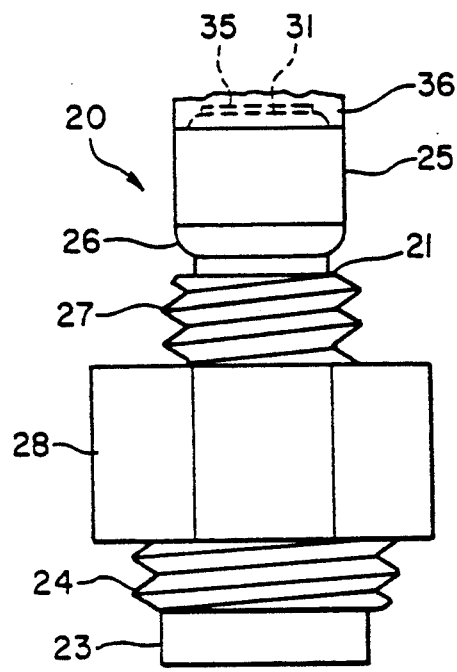
FIG. 6 is a lateral view of a pressure sensor being made according to the present invention, with the side wall machined to specification and the top of the pressure sensor machined roughly.

The fourth step is to machine the pressure sensor 20 to a shape as illustrated in FIG. 6. Metal 36 deposited on the side wall 32 of the membrane 30 and the retaining ring 25 are machined to form a cylinder wall with a predetermined diameter that matches the diameter of a through hole 12 in wall 10 of a test object. At this stage, it is also advantageous to machine the top of the pressure sensor 20 to remove some of the metal 36 deposited on the top surface 31 of the membrane 30, but care must be taken not to touch the top surface 31 of the membrane 30 at this stage.

Figure 7:
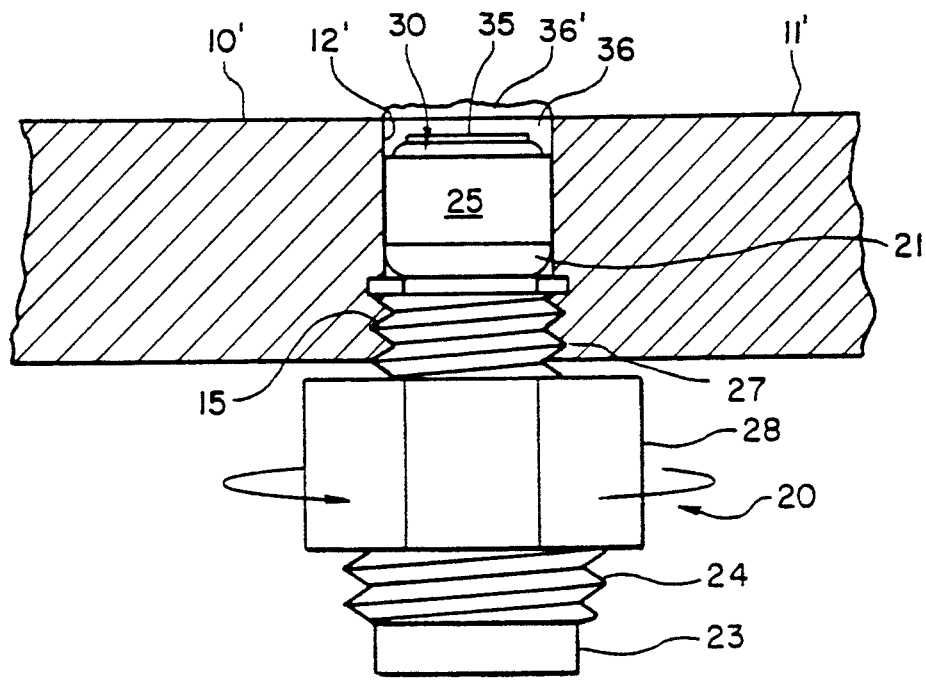
FIG. 7 is a lateral view, partly in section, of the pressure sensor shown in FIG. 6 mounted in a through hole with the top surface protruding for machining.

The fifth step is to finish the top of the pressure sensor 20. This is done with the pressure sensor 20 mounted in a machining jig 10', as shown in FIG. 7. The jig 10' has a through hole 12' and a flat top surface 11', and the pressure sensor 20 is mounted by means of female threads 15 in the jig 10' and matching male threads 27 on the body 21 of the pressure sensor 20. The diameter of the through hole 12' in the jig 10' is the same as the diameter of the mounting hole 12 for the pressure sensor 20 in the wall 10 of the test object, and it matches the diameter of the tip of the pressure sensor 20 after the previous machining step. A hexagonal tool grip 28 is provided for turning the pressure sensor body 21 during mounting and fine adjustment of the axial position of the pressure sensor 20.

The pressure sensor 20 is screwed into the through hole 12' in the jig 10' until a thin slice 36' of the deposited metal 36 protrudes beyond the surface 11', whereupon the protruding metal 36' is removed by careful machining or lapping. The pressure sensor 20 is then repositioned by a small increment such that the indicator layer moves closer to the surface 11' of the jig 10', causing the deposited metal 36 again to protrude. The protruding metal 36' is again machined or lapped until flush with the surface 11'. This process is repeated until the thin indicator layer 35 on the top surface 31 of the membrane 30 becomes visible. A final lapping is then performed to remove the indicator layer 35, so the top surface 31 of the membrane 30 is exposed, and a smooth surface flush with the surface 11' is achieved. When a soft metal like nickel is used as the deposited metal 36, the machining and lapping process will cause the deposited metal 36 to flow and fill in small voids in the surface of the pressure sensor 20, so a perfectly sharp edge 38 is formed at the edge of the flat top surface 31 of the pressure sensor 20. See FIG. 8.

The machining and lapping to remove the deposited metal 36 from the top surface 31 of the membrane 30 can also be performed without the aid of an indicator layer 35. Repeated measurements of the remaining thickness of the membrane can instead be used, with the machining and lapping process stopped when the measured thickness equals the thickness of the stretched membrane 30 itself. Such thickness measurements can be made directly by a caliper through the center hole in the pressure sensor body 21, or by subtracting the thickness of the tension ring 22 plus the length of the membrane tension adjuster 23 from the total length of the assembly including membrane 30, or indirectly by measurement of the stiffness of the membrane 30 plus deposited metal 36. The thickness of the membrane 30, however, is very small compared to the overall dimension of the pressure sensor assembly 21, 22, 23, 30, so care must be taken to obtain accurate values for the remaining thickness of the membrane 30 plus remaining metal 36. The application of a thin indicator layer 35 having a color different from the color of the membrane 30 on the top surface 31 of the membrane 30 is accordingly not a required part of the present invention, but it provides the simplest and most accurate method for determining when to stop the removal of deposited metal 36 from the top surface 31 of the membrane 30 without risk of removing part of the membrane 30 itself.

Figure 8:
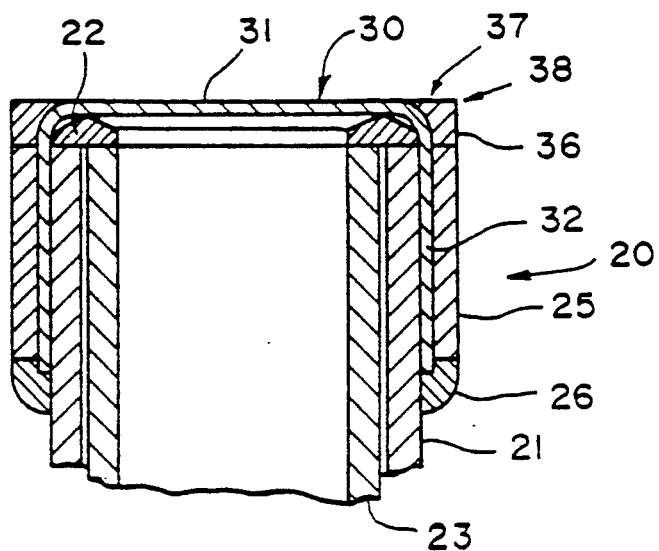
FIG. 8 is a partial cross sectional view of a finished pressure sensor according to the present invention.

FIG. 8 is a cross section of the top of the pressure sensor 20 along its axis, after the final lapping step. The top surface 31 of the membrane 30 is free from deposited metal 36, but the rounded edge of the membrane 30 is covered by deposited metal 36 forming a fillet 37 with a sharp edge 38, so the pressure sensor 20 now has a flat top surface that can fit perfectly flush with a test surface 11. The deposited metal 36 has very strong adhesion to the metal membrane 30, especially when the deposited metal 36 is the same as the metal of the membrane 30, so the fillet 37 is essentially an integral lateral extension of the membrane 30. The fillet 37 does not affect the dynamic properties of the stretched membrane inside the tension ring, and there is no risk that the performance of the pressure sensor 20 will be subject to creep or aging.

Figure 9:
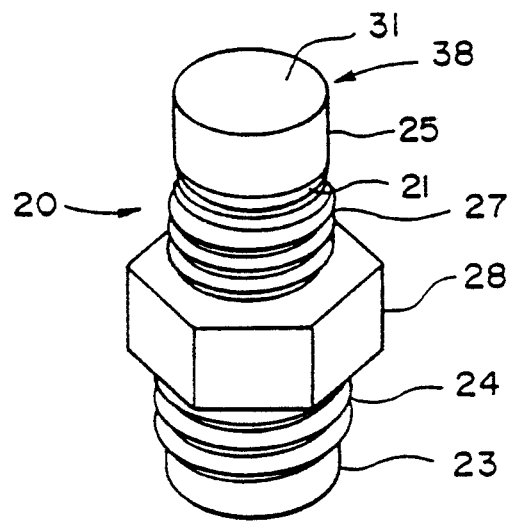
FIG. 9 is a perspective view of a finished pressure sensor according to the present invention.

A finished pressure sensor according to the present invention is shown in FIG. 9. The pressure sensor 20 has a flat top surface 31 with a sharp edge 38, so it will fit perfectly flush in a test surface 11. The term "perfectly flush" is used herein to mean that the pressure sensor when mounted in a test surface will not significantly disturb a boundary layer of fluid flow along the test surface. A typical surface finish of 10 microinches rms is achievable for precise flush mounting with the method according to the invention as described above. It is not possible to maintain a surface finish of such small magnitude when mounting membranes fabricated by prior art methods.

In cases when the test surface 11 is accessible, removal of excess deposited metal 36 from the top surface 31 of the membrane 30, or at least the final lapping operation, can be made with the pressure sensor 20 mounted in the test surface 11. The process is exactly as described above in connection with FIG. 7. When the deposited metal 36 is a soft metal, such as nickel, the final lapping of the surface will fill in small final voids in the test surface 11 and its transition to the pressure sensor 20, as well as in the top surface 31 of the pressure sensor 20, so a very high degree of perfection in the flush match between the pressure sensor 20 and the test surface 11 can be achieved in this case. After use, the pressure sensor 20 may be removed from the wall 10 of the test object for use in another location, or for later reinstallation.

It should be understood that the mounting of the pressure sensor 20 in a wall 10 with test surface 11 can be made by other methods than screw threads 15, 27 as described above. A variety of such alternative mounting methods are well known to those skilled in the art.

The description above has been directed to operations that are important parts of the present invention. Necessary, but well known steps in the manufacture of a pressure sensor have been excluded from the description above for the sake of clarity. Examples of such steps are the mounting of a pressure sensor for membrane displacements, wiring of the displacement sensor, and sealing of cables and/or connectors. These steps are suitably made either before the final machining of the pressure sensor 20 as described in connection with FIG. 7, or after the final surface finish is obtained.

Numerous modifications and adaptations of the present invention will be apparent to those skilled in the art. Thus, the following claims are intended to cover all such modifications and adaptations which fall within the true spirit and scope of the present invention.

What is claimed is:

1. A method for making a dynamic pressure sensor having a flat sensing surface with a sharp edge, comprising the steps of:
   (a) providing a dynamic pressure sensor with a stretched metal membrane in the form of an inverted cup with a flat top surface and rounded edge;
   (b) depositing metal on said membrane along said rounded edge; and
   (c) machining said deposited metal to form a substantially cylindrical side wall of predetermined diameter and a flat top surface flush with the top surface of said membrane.

2. A method for making a dynamic pressure sensor having a flat sensing surface with a sharp edge according to claim 1, wherein said metal membrane and said deposited metal are both made from nickel.

3. A method for making a dynamic pressure sensor having a flat sensing surface and a sharp edge according to claim 1, further comprising the steps of:
 (d) applying a thin indicator layer having a color different from that of the membrane before metal is deposited on said membrane; and
 (e) machining and lapping the flat top of said deposited metal until said indicator layer has been removed.

4. A dynamic pressure sensor, comprising:
 (a) a pressure sensor body having a tubular top and a substantially cylindrical upper side wall;
 (b) an inverted cup shaped membrane fitted over said tubular top and bonded to said upper side wall;
 (c) means for stretching a top surface of said membrane, whereby said top surface forms a flat pre-stressed area with a rounded edge; and
 (d) a metal fillet deposited on said rounded edge and machined to form a sharp edge flush with said top surface.

5. A dynamic pressure sensor according to claim 4, wherein said membrane is made from nickel foil and said metal fillet is made from nickel electro-deposited on said membrane.

6. A method for mounting a dynamic pressure sensor flush with a test surface, comprising the steps of:
 (a) providing an opening through the test surface;
 (b) providing a dynamic pressure sensor with a stretched metal membrane, said membrane forming a flat top surface with a rounded edge and a side wall fitting loosely inside said opening;
 (c) applying a thin indicator layer having a color different from that of the membrane to the top surface of said membrane;
 (d) depositing a layer of metal on said side wall and on said metal membrane over said indicator layer;
 (e) machining said deposited layer of metal to form a new side wall fitting tightly in said opening and having a flat top;
 (f) mounting said pressure sensor adjustably in said opening with said flat top protruding slightly beyond said test surface;
 (g) removing deposited metal protruding beyond said test surface in small steps; and
 (h) fixing said pressure sensor in place when said indicator layer has been removed.

7. A method for mounting a dynamic pressure sensor flush with a test surface according to claim 6, wherein said metal membrane and said deposited metal are both made of nickel.

8. A method for mounting a dynamic pressure sensor flush with a test surface according to claim 6, wherein the final removal of deposited metal and said indicator layer is made by lapping.

* * * * *